(12) United States Patent
Buchwald et al.

(10) Patent No.: US 9,088,996 B2
(45) Date of Patent: Jul. 21, 2015

(54) GEO-LOCATION BASED DYNAMIC UPLINK TRAFFIC CHANNEL ALLOCATION

(71) Applicant: MOTOROLA SOLUTIONS, INC, Schaumburg, IL (US)

(72) Inventors: Gregory J. Buchwald, Crystal Lake, IL (US); David P. Gurney, Carpentersville, IL (US); Arthur Christopher Leyh, Spring Grove, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 96 days.

(21) Appl. No.: 14/081,497

(22) Filed: Nov. 15, 2013

(65) Prior Publication Data

US 2015/0139073 A1    May 21, 2015

(51) Int. Cl.
*H04W 4/00*      (2009.01)
*H04W 72/08*     (2009.01)
*H04W 84/08*     (2009.01)

(52) U.S. Cl.
CPC ............ *H04W 72/085* (2013.01); *H04W 84/08* (2013.01)

(58) Field of Classification Search
None
See application file for complete search history.

(56) References Cited

U.S. PATENT DOCUMENTS

| 6,185,423 | B1 | 2/2001 | Brown et al. |
| 7,336,969 | B2 | 2/2008 | Minnick et al. |
| 7,853,267 | B2 | 12/2010 | Jensen |
| 7,957,696 | B2 | 6/2011 | Der |
| 2006/0135180 | A1 | 6/2006 | Jakel et al. |
| 2009/0326810 | A1* | 12/2009 | Callaghan et al. ............ 701/208 |
| 2011/0149157 | A1* | 6/2011 | Frerking ....................... 348/500 |
| 2011/0287795 | A1 | 11/2011 | Cahill |
| 2013/0266054 | A1* | 10/2013 | Choi et al. .................... 375/227 |
| 2014/0228053 | A1* | 8/2014 | Zhou et al. ................. 455/456.3 |

* cited by examiner

*Primary Examiner* — Chi H Pham
*Assistant Examiner* — Soon-Dong D Hyun
(74) *Attorney, Agent, or Firm* — Daniel R. Bestor

(57) ABSTRACT

Spectral efficiency is improved by assigning uplink channels according to expected receive signal levels at a serving base station. A first subscriber device detects a new call request indication, and then determines, as a function of its transmit power level and current location relative to the serving base station, an expected receive signal strength indication (RSSI) at its serving base station. Depending on whether it is determined that the expected RSSI is greater than or less than a RSSI threshold: one of (i) transmitting a call request to the serving base station requesting an assignment to a respective designated high-power or low-power channel for the new call and (ii) transmitting the new call on a respective pre-allocated high-power or low-power channel.

20 Claims, 6 Drawing Sheets

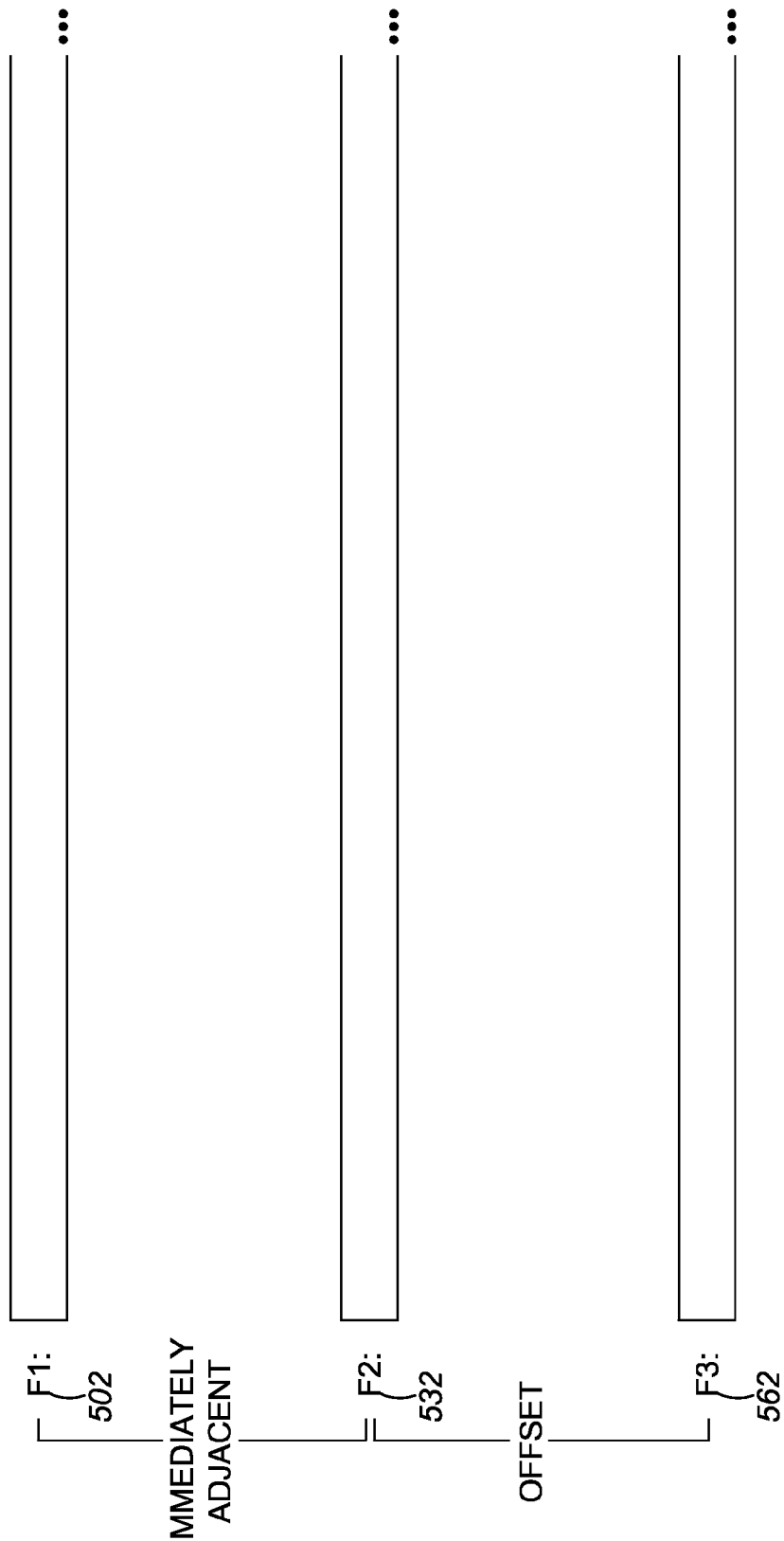

GEO-LOCATION BASED DYNAMIC UPLINK TRAFFIC CHANNEL ALLOCATION

BACKGROUND OF THE INVENTION

Radio access networks (RANs) provide for radio communication links to be arranged within the system between a plurality of user terminals. Such user terminals may be mobile and may be known as 'mobile stations' or 'subscriber devices.' At least one other terminal, e.g. used in conjunction with subscriber devices, may be a fixed terminal, e.g. a control terminal, base station, repeater, and/or access point (hereinafter, "base station"). Such a RAN typically includes a system infrastructure that generally includes a network of various base stations, which are in direct radio communication with the subscriber devices. Each of the base stations operating in the RAN may have one or more transceivers which may, for example, serve subscriber devices in a given local region or area, known as a 'cell' or 'site', by radio frequency (RF) communication. The subscriber devices that are in direct communication with a particular base station are said to be served by the base station. In one example, all radio communications to and from each subscriber device within the RAN are made via respective serving base stations. Sites of neighboring base stations may be offset from one another or may be non-overlapping or partially or fully overlapping.

RANs may operate according to an industry standard protocol such as, for example, the Project 25 (P25) standard defined by the Association of Public Safety Communications Officials International (APCO), or other radio protocols, such as the TErrestrial Trunked RAdio (TETRA) standard defined by the European Telecommunication Standards Institute (ETSI) or the Digital Mobile Radio (DMR) standard also defined by the ETSI, as well as others. Communications in accordance with any one or more of these standards, or other standards, may take place over physical channels in accordance with one or more of a TDMA (Time Division Multiple Access), FDMA (Frequency Division Multiple Access), OFDMA (Orthogonal Frequency Division Multiple Access), or CDMA (Code Division Multiple Access) protocol. Subscriber devices in RANs such as those set forth above send user communicated speech, video, audio, and/or data, herein referred to collectively as 'traffic information', in accordance with the designated protocol.

Land mobile radio (LMR) RANs may operate in either a conventional or trunked configuration. In either configuration, a plurality of subscriber devices are partitioned into separate groups of subscriber devices. In a conventional system, each subscriber device in a group is selected to a particular frequency for communications associated with that subscriber device's group. Thus, each group is served by one channel, and multiple groups may share the same single frequency (in which case, in some embodiments, signaling in the form of group IDs may be present in the broadcast data to distinguish between groups using the same shared frequency).

In contrast, a trunked radio system and its subscriber devices use a pool of traffic channels for virtually an unlimited number of groups of subscriber devices (e.g., talkgroups). Thus, all groups are served by all channels. The trunked radio system works to take advantage of the probability that not all groups need a traffic channel for communication at the same time. When a member of a group requests a call on a control or rest channel on which all of the subscriber devices in the system idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the subscriber devices were idling to a traffic channel for the call, and instruct all subscriber devices that are not participating in the call to move to a newly assigned control or rest channel selected from the pool of available channels. With a given number of channels, a much greater number of groups can be accommodated in a trunked system as compared with conventional radio systems.

One possible LMR protocol, for example, is the ETSI-DMR standard, which is a direct digital replacement for analog Private Mobile Radio (PMR). DMR is a scalable system that can be used in unlicensed mode (in certain allocations within certain regions or countries), and in licensed mode, subject to national or regional frequency planning.

DMR promises improved range, higher data rates, more efficient use of spectrum, and improved battery life. Features supported include fast call set-up, calls to groups and individuals, short data and packet data calls. Supported communications modes include individual calls, group calls, and broadcast calls provided among the radios operating within the network. Other important DMR functions such as emergency calls, priority calls, short data messages and Internet Protocol (IP) packet data transmissions are also supported.

The ETSI-DMR standard provides for 6.25e (2:1 TDMA) operation in repeater mode. 6.25e operation refers to 6.25 Kilohertz (kHz) equivalent spectral efficiency and 2:1 refers to the slotting ratio supported on the TDMA air interface, in this case supporting two repeating (e.g., recurring) interleaved time slots. As there is no restriction on what happens in either time slot or any interrelation between them (other than the need to maintain time synchronicity), it is possible to have two entirely separate conversations at the same time from two different units.

ETSI-DMR is just one example, and other trunked or conventional LMR protocols (such as APCO P25 or TETRA) could be used as well.

For any of the above-mentioned protocols, corresponding 'public safety' RANs provide for group-based radio communications amongst a plurality of subscriber devices such that one member of a designated group can transmit once and have that transmission received by all other members of the group substantially simultaneously. Groups are conventionally assigned based on function. For example, all members of a particular local police force may be assigned to a same group so that all members of the particular local police force can stay in contact with one another, while avoiding the random transmissions of radio users outside of the local police force group.

When an event or incident occurs, such as a fire or accident, numerous different groups may respond to the incident, including for example, direct first responders such as police, fire, and medical groups and supporting responders such as utility, traffic control, crowd control groups, among others.

One problem that may occur in any of the above radio systems in which an infrastructure repeater is being used to repeat communications received on an uplink channel between a subscriber device and its serving base station (via either a trunked or conventional uplink traffic channel), is that uplink-transmitting subscriber devices close to the serving base station may over-power and/or interfere with other uplink-transmitting subscriber devices farther away from the serving BS when those uplink traffic channels are immediately adjacent one another on the frequency spectrum.

Historically, in the United States and worldwide, excessive guardbands between adjacent channels were instituted to prevent interference between those adjacent channels. However, due to increased demand for radio bandwidth and a desire to increase efficient use of the radio spectrum, guardbands have been shrinking across most of the spectrum.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 5 is a frequency diagram illustrating an application of the process of FIGS. 3A-3B to uplink traffic channel allocation in a conventional radio system in accordance with an embodiment.

Figure 1:
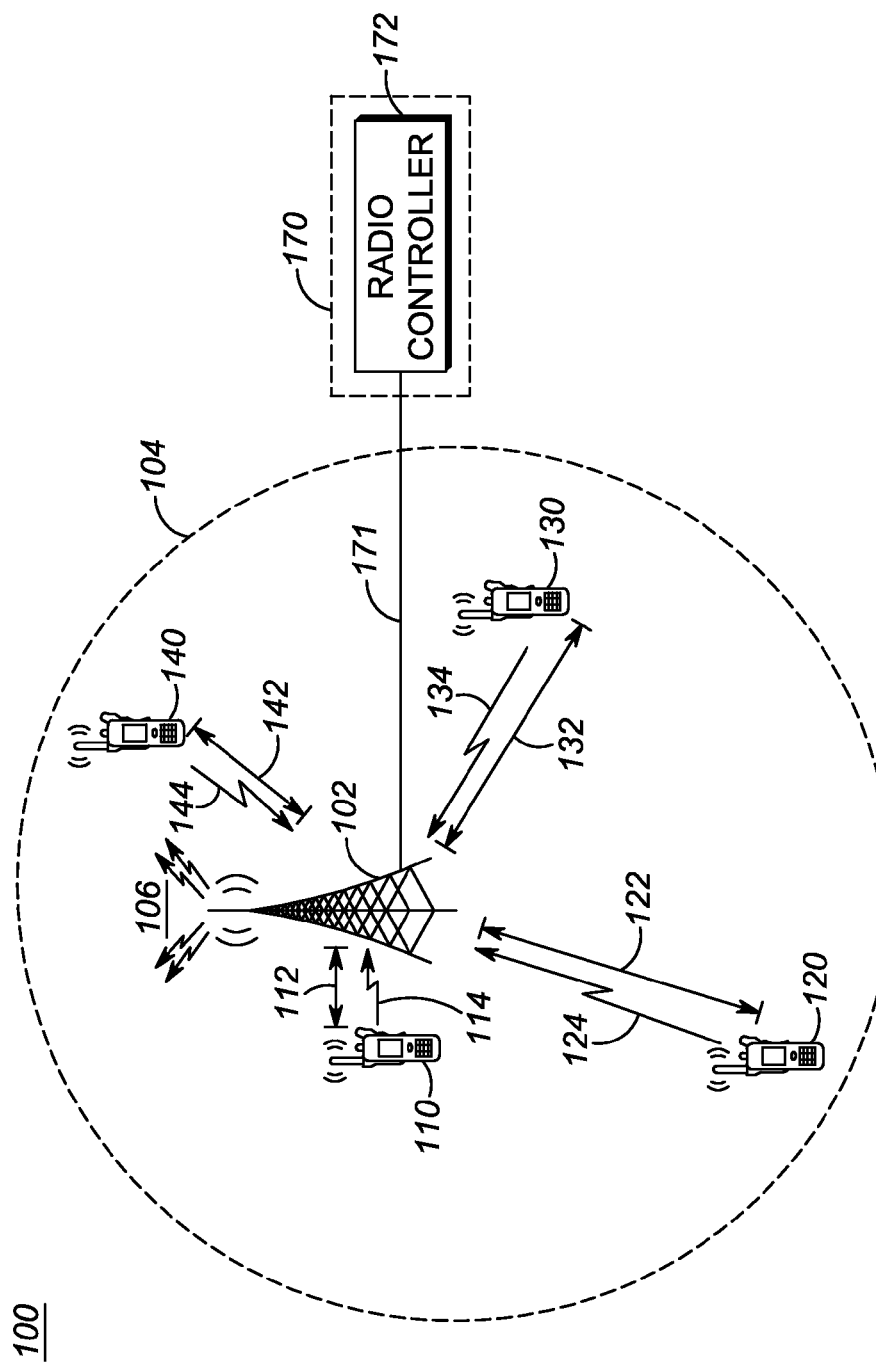
FIG. 1 is a block diagram of a wireless communications system in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Recent and pending regulatory rulings in the United States and worldwide, for example, have begun to allow multiple independent carriers of certain modulation methods to occupy a single licensed channel without exceeding first adjacent channel emissions regulations and requirements. For example, in such systems, two digital LMR carriers may be partially offset within the same channel to effectively double system capacity and spectral efficiency. In other systems, channels may be formed immediately adjacent one another even when not a result of a channel split, where in the past significant guardbands were introduced between the adjacent channels to prevent interference. An example of this exists in the 900 MHz licensed LMR allocation in the United States and elsewhere.

Advancements in radio design have contributed to the possibility of using split channels and/or reduced adjacent channel guardbands. For example, the frequency stability of LMR units is much improved with the use of the modern techniques, such as high precision temperature-compensated oscillators, global position system (GPS) locked systems, and automatic frequency control training algorithms. In addition, the adjacent channel rejection (ACR) performance of modern radios has greatly improved.

Since base station outbound/downlink carriers are typically co-located transmissions from a same base station, a sufficient Undesired to Desired (U/D) ratio criteria (e.g., in the range of 60 dB) is always met at the distant subscriber devices using modern techniques, even when frequency selective fading and other channel effects are taken into account.

However, and due to the inherent mobility of subscriber (e.g., portable or mobile) devices within a cell or site, large received signal dynamic ranges may be present at the base station receiver (since the inbound/uplink subscriber device radio transmissions are not co-located and in fact are typically widely distributed within the cell or site). Signal levels may be received with up to a roughly 80 dB difference at the base station receiver input due to the near/far transmissions of varying power levels and the individual channel effects (exceeding the 60 dB U/D adjacent channel receiver tolerance).

What is needed is an improved method, system, and device for mitigating the potential interference effects that can result in proposed uplink capacity doubled or otherwise immediately adjacent uplink traffic channel systems. Accordingly, disclosed is an improved method, system, and device is disclosed herein for mitigating the potential interference effects that can result in proposed uplink capacity doubled or otherwise immediately adjacent uplink channel systems, using geo-location. Further, the improved method, system, and device mitigates the potential interference using geo-location without requiring the reporting of the location of the transmitting subscriber device to the infrastructure. The latter feature may be important in those situations in which contract terms or union requirements, for example, prohibit reporting of employee location to a centralized location (e.g., the infrastructure). In accordance with a first embodiment, a method for improving spectral efficiency by assigning uplink channels according to expected receive signal levels at a serving base station providing wireless communications to a first subscriber device includes: detecting, at the first subscriber device, a new call request indication, determining, as a function of the first subscriber device transmit power level and its current location relative to the serving base station, an expected receive signal strength indication (RSSI) of signals transmitted by the first subscriber device and received at the serving base station, if it is determined that the expected RSSI is greater than a pre-determined RSSI threshold: one of (i) transmitting a call request to the serving base station requesting an assignment to a designated high-power channel for the new call and (ii) transmitting the new call on a pre-allocated high-power channel, and if it is determined that the expected RSSI is less than the pre-determined RSSI threshold: one of (i) transmitting a call request to the serving base station requesting an assignment to a designated low-power channel for the new call and (ii) transmitting the new call on a pre-allocated low-power channel.

In accordance with a second embodiment, a subscriber device for improving spectral efficiency by requesting or using uplink channels according to expected receive signal levels at a serving base station providing wireless communications to a first subscriber device includes: a transceiver, a memory, and a processor configured to: detect a new call request indication, determine, as a function of the subscriber device transmit power level and its current location relative to the serving base station, an expected receive signal strength indication (RSSI) of signals transmitted by the first subscriber device and received at the serving base station, if it is determined that the expected RSSI is greater than a pre-determined RSSI threshold: one of (i) transmit a call request, via the transceiver, to the serving base station requesting an assignment to a designated high-power channel for the new call and (ii) transmit the new call, via the transceiver, on a pre-allocated high-power channel, and if it is determined that the expected RSSI is less than the pre-determined RSSI threshold: one of (i) transmit, via the transceiver, a call request to the serving base station requesting an assignment to a designated low-power channel for the new call and (ii) transmit, via the transceiver, the new call on a pre-allocated low-power channel.

Each of the above-mentioned embodiments will be discussed in more detail below, starting with example network and device architectures of the system in which the embodiments may be practiced, followed by a discussion of uplink traffic channel assignment and use from a device and system perspective. Further advantages and features consistent with this disclosure will be set forth in the following detailed description, with reference to the figures.

I. Network and Device Architectures

Referring to FIG. 1, one embodiment of a wireless communication system 100 according to the present disclosure is shown. It will be apparent to those skilled in the art that the system 100 and the components that are to be described as operating therein may take a number of forms well known to those skilled in the art. Thus, the layout of the system 100, and of its operational components to be described, should be regarded as illustrative rather than limiting. The system 100 of FIG. 1 will be described as an illustrative wireless communication system capable of operating in accordance with any one or more standard protocols, such as the APCO P25 standard, the DMR standard, or the TETRA standard, among other possibilities.

The system 100 shown in FIG. 1 includes a fixed terminal (e.g., base station, BS) 102 having a corresponding radio site (e.g., coverage area) 104 over which wireless communication services are provided to one or more subscriber devices (SDs) 110, 120, 130, 140. The BS 102 may be operably connected to a system infrastructure 170 including a radio controller 172 via a wired or wireless link 171. While the term BS will be used to refer to the fixed terminal, for ease of reference, it should be noted that the fixed terminals may, in some embodiments, be some other type of fixed or nomadic (e.g., temporary fixed) terminal.

The BS 102 may have radio links 106, 114, 124, 134, 144 with one or more of the SDs. The radio controller 172 may be, for example, a zone controller, a mobile switching center, or a serving gateway, and may provide a signaling path between BSs and an external network and may act to manage resources (such as conventional, control, and/or traffic channels) at BSs under its control. The radio controller 172 may also function to assign uplink traffic channels in accordance with embodiments disclosed herein, and may provide other functions to the BSs and/or SDs as well. In general, the BS 102 and system infrastructure 170, together, is considered to be a radio access network (RAN).

The BS 102 and corresponding radio site 104 may operate as a conventional or trunked narrowband radio site. In a conventional radio system, a plurality of SDs are formed into groups. In the conventional radio system example, each radio uplink 114, 124, 134, 144 may be a separate conventional frequency in an FDMA radio system. Each uplink traffic channel 114, 124, 134, 144 may carry call media payload (video, audio, audio/video) from a respective SD to a corresponding conventional repeater at the BS 102, which can then repeat the uplink call media payload on a corresponding downlink channel (not shown) to one or more individual SDs or group SDs (not shown) that are intended recipients of the call. In the conventional radio system, control channel 106 is not used.

In a trunked radio system example, each uplink traffic channel 114, 124, 134, 144 may be a separate dynamically assigned uplink traffic channel in an FDMA or TDMA radio system. An SD requesting a new call, such as SD 110, transmits a request for a traffic channel for the call on reserved control channel 106, e.g., a designated channel in the system that all idle SDs monitor for new call announcements and/or new control channel assignments. Once a particular traffic channel is assigned for the call from a group of available traffic channels (for example, uplink traffic channel 114), a call grant is provided over the control channel identifying the assigned uplink traffic channel for the call (which, in some cases, may be the control channel 106 itself, in which case the control channel is then moved to another channel), and the SD 110 requesting the call moves to the assigned uplink channel 114 and transmits a call media (video, audio, audio/video) payload to a corresponding trunked repeater for the assigned uplink traffic channel at the BS 102. The corresponding trunked repeater then repeats the uplink call media payload on a corresponding downlink traffic channel (not shown) to one or more individual SDs or group SDs (not shown) that are intended recipients of the call. After the call is completed, the SDs participating in the call move from the assigned uplink traffic channel to the current control channel 106 in the system (which may be the same or different from the original control channel over which the call request was transmitted).

Other types of conventional and trunked configurations are possible as well.

A plurality of uplink transmitting source SDs 110, 120, 130, 140 are illustrated in FIG. 1 as operating within the wireless communication system 100, and specifically within the radio site 104. In other embodiments, fewer or more uplink transmitting source SDs may be active in radio site 104. Furthermore, and as noted above, additional SDs present within radio site 104 receive the calls being transmitted by uplink transmitting source SDs 110, 120, 130, 140, but are not illustrated in FIG. 1 for ease of illustration. In addition, although only one BS 102 is illustrated in FIG. 1, in other examples, more than one BS 102 may provide wireless communications services within all or a portion of, or adjacent to, radio site 104.

In the example set forth in FIG. 1, BS 102 serves SDs 110, 120, 130, 140 within its coverage area 104 with radio communications to and from other terminals, the other terminals including (i) SDs served by the same BS (e.g., BS 102), (ii) SDs (not shown) served by other BSs, and (iii) other terminals including SDs in other systems (not shown) operably linked to the system 100 via the system infrastructure 170 and/or a wide area network (WAN, not shown) coupled to the system infrastructure 170. Each SD 110, 120, 130, 140 is illustrated in FIG. 1 as being at a particular distance away from the serving BS 102, which is of course subject to change as the SD moves about. For example, and in order from closest to farthest, SD 110 is a distance 112 away from BS 102, SD 140 is a distance 142 away from BS 102, SD 130 is a distance 132 away from BS 102, and SD 120 is a distance 122 away from BS 102.

System infrastructure 170 supporting BS 102 and perhaps other BSs, in addition to radio controller 172, may include known sub-systems (not shown) required for operation of the system 100. Such sub-systems may include, for example, sub-systems providing authentication, routing, SU registration and location, system management and other operational functions within the system 100, some of which may be provided by radio controller 172. The system infrastructure 170 may additionally provide routes to other BSs (not shown) providing radio sites serving other SDs, and/or may provide access to other types of networks such as a plain old telephone system (POTS) network (not shown) or a data-switched network WAN such as the Internet.

Figure 2:
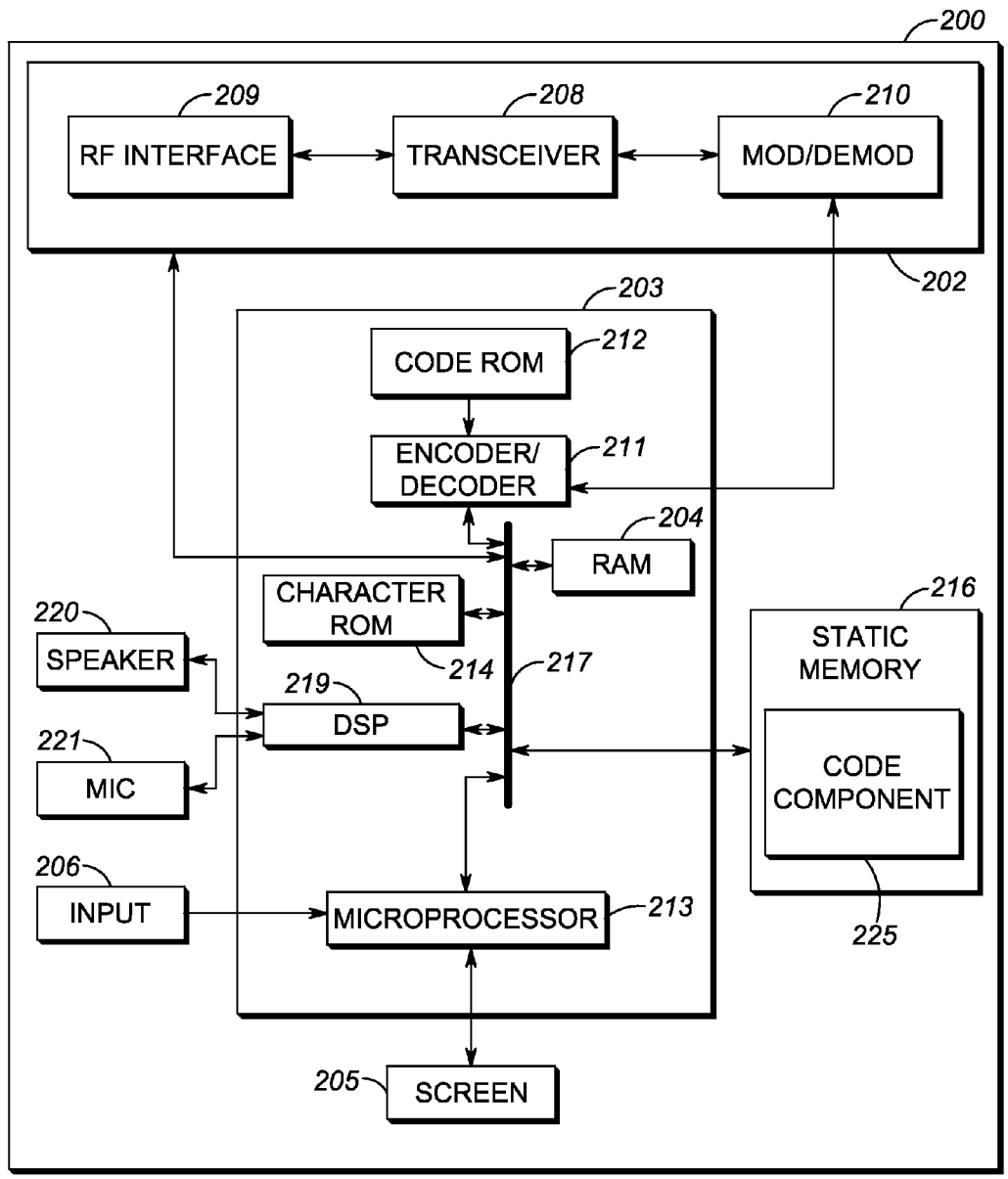
FIG. 2 is a block diagram illustrating a subscriber device in accordance with an embodiment.

FIG. 2 is an example functional block diagram of a SD 200, such as SD 110 operating within the system 100 of FIG. 1, in accordance with some embodiments. Other SDs such as SDs 120, 130, 140 may contain same or similar structures. As shown in FIG. 2, SD 200 includes a communications unit 202 coupled to a common data and address bus 217 of a processing unit 203. The SD 200 may also include an input unit (e.g., keypad, pointing device, etc.) 206, an output transducer unit (e.g., speaker) 220, an input transducer unit (e.g., a microphone) (MIC) 221, and a display screen 205, each coupled to be in communication with the processing unit 203. The speaker/microphone configuration may be configured with Push-To-Talk (PTT) capability.

Processing unit 203 may include an encoder/decoder 211 with an associated code ROM 212 for storing data for encoding and decoding voice, data, control, or other signals that may be transmitted or received by SD 200. Processing unit 203 may further include a microprocessor 213 coupled, by the common data and address bus 217, to the encoder/decoder 211, a character ROM 214, a RAM 204, and a static memory 216. The processing unit 203 may also include a digital signal processor (DSP) 219, coupled to the speaker 220, the microphone 221, and the common data and address bus 217. In some embodiments, one or both of the microprocessor 213 and DSP 219 may calculate expected RSSIs using information retrieved from one or more of a GPS receiver, the communications unit 202, and the static memory 216.

Communications unit 202 may include an RF interface 209 configurable to communicate with network components such as BSs, and other user equipment within its communication range. Communications unit 202 may include one or more wireless transceivers 208, such as an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver perhaps operating in accordance with an IEEE 802.16 standard, and/or other similar type of wireless transceiver configurable to communicate via a wireless network for infrastructure communications. The transceiver(s) may be coupled to a combined modulator/demodulator 210 that is coupled to the encoder/decoder 211.

The character ROM 214 stores code for decoding or encoding data such as control, request, or instruction messages, channel assignment messages, and/or data or media messages that may be transmitted or received by SD 200. Static memory 216 may store operating code for performing one or more of the steps, transmissions, and/or receptions set forth in FIGS. 3A-3B.

II. Geo-Location Based Dynamic Uplink Traffic Channel Allocation Processes

Figure 3A:
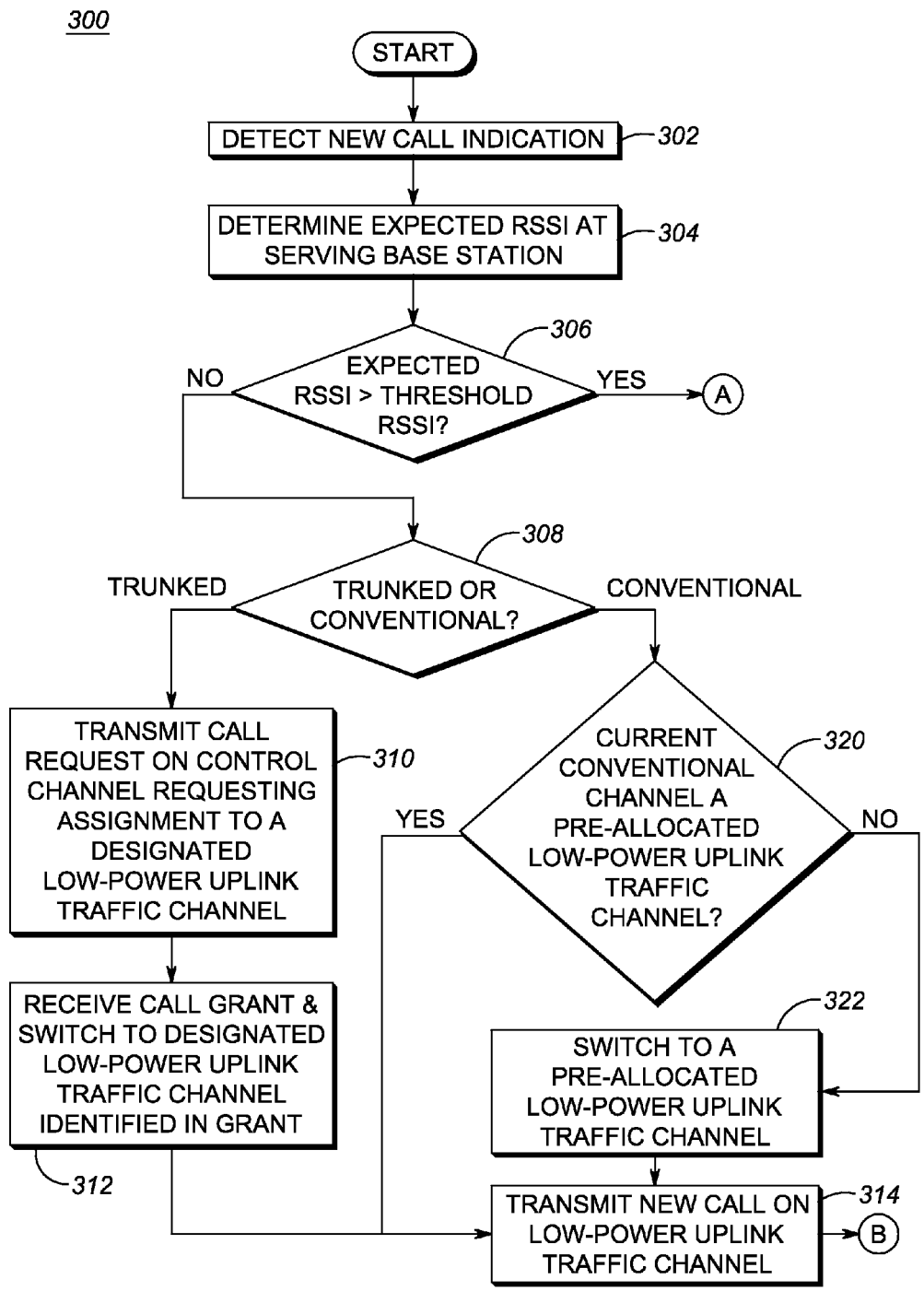
FIGS. 3A-3B set forth a flow chart illustrating an example process for mitigating adjacent uplink traffic channel interference using geo-location in accordance with an embodiment.
Figure 3B:
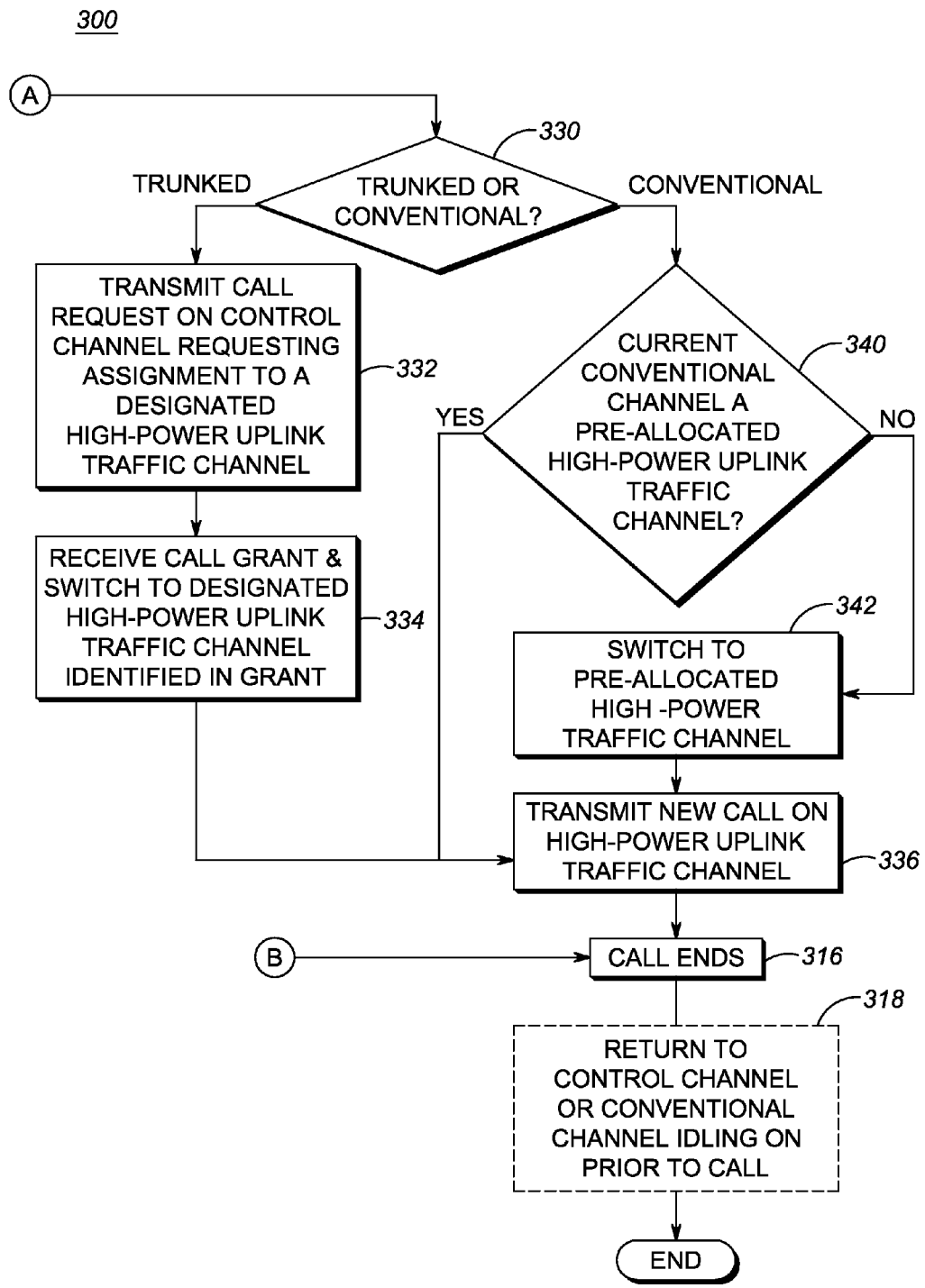

FIGS. 3A-3B set forth an example flow chart of a geo-location based dynamic uplink traffic channel allocation process that may be executed at a subscriber device in accordance with some embodiments. In the examples set forth in detail below, only particular sequences are disclosed with respect to a single example subscriber device. Of course, additional steps or message transmissions or receptions not disclosed herein could be additionally added before, after, or in-between processing steps or message transmissions or receptions disclosed in FIGS. 3A-3B, and the presence of such additional steps or message transmissions or receptions would not negate the purposes and advantages of the geo-location based dynamic traffic uplink channel allocation examples set forth in detail throughout the remainder of this disclosure.

At step 302 of FIG. 3A, an uplink transmitting source SD detects a new call indication. The new call indication may be generated internally in response to a user depressing a PTT button on an input interface of a SD such as the input 206 of SD 200 of FIG. 2. A rotary dial may be used to select a particular target SD or group of target SDs to transmit to when the PTT button is depressed. Other examples are possible as well. For example, a user may select a particular group from a plurality of groups on a display screen such as screen 205 of SD 200 of FIG. 2, and the new call indication may be generated internally in response to a user depressing a "selection" input button selecting a particular one of the groups. Still further, a new call indication signal may be received over a local personal area network (PAN) or piconet or via a locally paired Bluetooth or other short-area device such as a hand-free communication device, vehicle radio, or other locally available device that may use the source SD's infrastructure connection to transmit a new call.

At step 304, the uplink transmitting source SD determines an expected RSSI at its serving base station for signals transmitted by the uplink transmitting source SD at its configured or current transmit power level. Step 304 may be executed responsive to step 302, or at some regular (e.g., such as every 1-5 minutes) or irregular (e.g., event- or motion-based) interval before and/or after step 302 so that expected RSSI information is relatively current at a time when a new call indication is detected at step 302.

In any event, at step 304, the uplink transmitting source SD determines an expected RSSI at its serving base station, for signals transmitted by the uplink transmitting source SD, in any one of a number of different ways.

In a first example of determining an expected RSSI, the uplink transmitting source SD may calculate the expected RSSI. In general, the uplink transmitting source SD calculates the expected RSSI using the following equation:

$$RSSI_{sub} = TPO_{TX-Sub} + G_{TX-Sub} - PL + G_{RX-BS} - L_{RX-BS}$$

where $RSSI_{sub}$ is the expected RSSI at the uplink transmitting source SD's serving BS, $TPO_{TX-Sub}$ is the transmit power output of the uplink transmitting source SD (in dBm), $G_{TX-Sub}$ is the gain of the uplink transmitting source SD's antenna (in dB), PL is the path loss (in dB) of the path between the uplink transmitting source SD and the serving BS, $G_{RX-BS}$ is the gain of the base station's receiving antenna system (in dB), and $L_{RX-BS}$ is the line losses of the base station receiving antenna system (in dB). At the very least in practice, a rough estimate of the expected RSSI can be established as long as $TPO_{TX-sub}$ and PL are known. A more accurate expected RSSI can be established if $G_{TX-}$, $G_{RX-BS}$, and $L_{RX-BS}$ are known as well.

The current transmit power ($TPO_{TX-Sub}$) of the uplink transmitting source SD may be statically configured and known by the uplink transmitting source SD, or may dynamically vary over time due to operating conditions and may be tracked by the uplink transmitting source SD. In any event, at any point in time, the uplink transmitting source SD can determine its current transmit power in calculating the expected RSSI at the serving BS. Similarly, the gain of the uplink transmitting source SD's antenna system ($G_{TX-Sub}$) is generally known and pre-configured at the uplink source transmitting source SD. Accordingly, and similarly, at any point in time, the uplink transmitting source SD can identify or retrieve its antenna gain value.

Path loss (PL) between the uplink transmitting source SD and the serving BS may be calculated in a number of different ways. At its most basic level, the path loss varies based on a current distance (D) between the uplink transmitting source SD and the serving BS, among other parameters. The distance D may be determined in any number of ways.

In a first example of determining distance D, the uplink transmitting source SD may determine its current absolute geographic location via one of a global navigation satellite system (GNSS) receiver such as a global position system (GPS) receiver, a time difference of arrival (TDOA) calculation using a plurality of different BS (or other fixed transmitters) received signals, or other geographic location determination technique. In this example, current longitude and latitude coordinates of the uplink transmitting source SD may be obtained via a GPS receiver.

At a same time, the uplink transmitting source SD obtains a current absolute geographic location of its serving BS. The current absolute geographic location of its serving BS may be stored in a geo-location database in a local storage, such as in a static memory 216 and/or RAM 204 of SD 200 of FIG. 2. The geo-location database may be pre-stored at SDs with all known geographic locations of BSs and associated BS-identifiers, or may be populated dynamically via over-the-air messaging with serving BSs during registration or sometime thereafter. The geo-location database may also store other parameters associated with each base station, such as its antenna height, and antenna gain or pattern, to be utilized in the RSSI computations.

Based on the determined two absolute geographic locations of the uplink transmitting source SD and the serving BS, the uplink transmitting source SD can determine a straight line distance (D) between them using a straightforward distance calculation, in some cases ignoring such things as the curvature of the earth, intervening structures or reflections, and differences in height. More detailed terrain, building and land-clutter database information may be stored in the geo-location database and may be employed in the path loss computations, if desired. However, in one model, path loss can be roughly approximated as line of sight, and dependent on 20 log(D).

In other embodiments, the uplink transmitting source SD may utilize a propagation model that can more accurately calculate a path loss PL between the uplink transmitting source SD and the serving BS. Propagation models such as a height above average terrain (HAAT) model, a point to point Lee model, an area to area Lee model, a Longley-Rice model, and an Okumura-Hata model could be used. For example, and consistent with the Okumura-Hata model, the path loss PL could be calculated in accordance with the following equation:

$$PL \text{ (in dB)} = 69.6 + 26.2 \log_{10}(F) - 13.8 \log_{10}(H_{BS}) - C + \{44.9 - 6.6 \log_{10}(H_{BS})\}\log_{10}(D)$$

where F is the frequency (in Mhz) of the signal being transmitted, $H_{BS}$ is the height of the BS antenna (in meters), and D is the determined distance already described above. C may vary based on the type of the environment. For example, for frequencies (F) between 200 and 1500 Mhz:

$$C=\{3.2(\log_{10}(11.75*H_{sub}))^2-5\} \text{ for large sized cities.}$$

$$C=0.8+\{1.1 \log_{10}(F)-0.7\}H_{sub}-1.56 \log_{10}(F) \text{ for small or medium sized cities.}$$

where C is the parameter C in the Okumura-Hata model, F is the frequency (in Mhz) of the signal being transmitted, and $H_{sub}$ is the height of the uplink transmitting source SD (which can be approximated as a fixed value, depending on nominal antenna height).

Of course, other propagation models could be used as well. For example, the Longley-Rice model utilizes a topographical map including a terrain database that can more accurately (but more costly in terms of time and compute power) calculate an expected RSSI. Topographical and terrain maps could be stored at the uplink transmitting source SD along with the geo-location database mentioned earlier.

Finally, returning to the expected RSSI equation above, BS characteristics, including one or both of $G_{RX-BS}$, and $L_{RX-BS}$ may be stored in the same geo-location database as the BS geographic location information as mentioned above, and may be retrieved by the uplink transmitting source SD on demand using the BS identifier. In other embodiments, separate antenna pattern information for each BS may be included as well.

In a second example of determining expected RSSI, the uplink transmitting source SD may determine its location in a manner same or similar to the first example, but instead of calculating the expected RSSI using a number of variables such as path loss PL and antenna gains, instead may access a geo-location database containing pre-calculated expected RSSIs for known serving BSs based on the uplink transmitting source SD's current location. Such geo-location databases may contain pre-calculated RSSIs determined using actual measurements in the field or using one or more of the propagation models noted above, among other possibilities. A separate geo-location database may be provided for each serving BS, perhaps identified via BS identifier, or a single geo-location database may contain a plurality of BSs indexed by BS identifier. Using the serving BS identifier obtained via over-the-air signaling (e.g., broadcast) from the serving BS or obtained via the geo-location database itself as the closest available serving BS relative to its current location, and using the determined current location of the uplink transmitting source SD, the uplink transmitting source SD can retrieve a pre-calculated expected RSSI from the geo-location database for that serving BS instead of calculating the expected RSSI on the fly, as set forth in the first example.

The geo-location database may be arranged in a number of ways. For example, continuous regions of similar expected RSSIs relative to a particular serving BS may be set forth such that a determination by the uplink transmitting source SD that its current location is within a particular region determines the pre-calculated expected RSSI to use. In another embodiment, discrete measurement points may be provided along with expected RSSIs, and a determination of a nearest discrete measurement point relative to its current location may determine the pre-calculated expected RSSI to use. Other possibilities exist as well.

Of course, this embodiment would require substantially more storage space than the first example in order to store the geo-location database containing pre-calculated RSSIs for a plurality of locations within a wireless communication range of each serving BS. On the other hand, expected RSSIs could be determined faster and with less processing power in this example relative to the first example.

In a third example of determining expected RSSI, the uplink transmitting source SD may determine its location in a manner same or similar to the first example, and as set forth above, determine its distance D from its serving BS using its location and the location of the serving BS. Additionally or alternatively, the distance D may also be estimated by determining an RSSI of a received signal from the serving BS, and using a known transmit power of the serving BS, perhaps determined via the geo-location database, over-the-air signaling, or something similar, estimate its distance from the serving BS using the determined RSSI of the received signal and the known transmit power alone. Other possibilities exist as well.

Once the distance D is determined, a pre-calculated distance to expected RSSI mapping may be accessed for that particular serving BS, and a particular expected RSSI retrieved using the determined distance D and a given operating carrier frequency range. For example, a table similar to Table I below may be used to determine the expected RSSI in this manner:

TABLE I

Example Pre-Calculated Expected RSSI Based on Distance D

| Base Station ID | Distance D Range (m) | Expected RSSI (dB) |
| --- | --- | --- |
| 0xAEF1 | 0-500 | −30 dB |
|  | 500-1000 | −45 dB |
|  | 1000+ | −65 dB |
| 0x901A | 0-300 | −25 dB |
|  | 300-600 | −35 dB |
|  | 600-900 | −50 dB |
|  | 900-1200 | −60 dB |
|  | 1200-1500 | −70 dB |
|  | 1500+ | −80 dB |

As set forth in Table I, an example geo-location database may include a pre-calculated expected RSSI based solely on the determined distance D between the uplink transmitting source SD and the serving BS. In this example, the uplink transmitting source SD may determine, perhaps using information stored in the geo-location database itself, stored elsewhere, or by monitoring over the air broadcasts, that it is within communication range of the serving BS with BS ID 0xAEF1, but not the serving BS with BS ID 0x901A. The BS IDs in this example may be radio IDs, hardware MAC addresses, IP addresses, or some other uniquely identifiable attribute of a serving BS. As illustrated in Table I, once a determination of a distance D between the uplink transmitting source SD and the serving BS is made by the uplink transmitting source SD, a simple lookup process may be executed at the uplink transmitting source SD to determine an expected RSSI of signals transmitted by the uplink transmitting source SD as received at the serving BS (in this case, BS ID 0xAEF1). For example, if the uplink transmitting source SD determines that it is currently approximately 250 meters away from the serving BS, it may retrieve and use an expected RSSI of −30 dB from the geo-location database, as set forth in Table I.

In all of the above examples of determining an expected RSSI at the serving base station, using geo-location, the uplink transmitting source SD is not required to, and in some embodiments does not, report its location to the infrastructure. Accordingly, the disclosed embodiments may be utilized even in those situations in which contract terms or union requirements, for example, prohibit reporting of employee location to a centralized location (e.g., the infrastructure).

Returning to FIG. 3A, once an expected RSSI is determined at step 304, processing proceeds to step 306, where the uplink transmitting source SD determines if the expected RSSI from step 304 is greater than a threshold RSSI. The value of the threshold RSSI may be statically configured in the wireless communication system 100 and pre-configured at each SD, or may be dynamically varied and set via over-the-air programming while the SD is registered with a serving BS. The threshold RSSI is set to a value to distinguish between expected RSSI receive strengths (high-power) that are likely to over-power and/or interfere with weaker received signals in immediately adjacent channels (e.g., immediately adjacent frequencies carrying FDMA, TDMA, OFDMA, or CDMA channels), and expected RSSI receive strengths (low-power) that are unlikely to over-power and/or interfere with received signals in immediately adjacent channels. For example, the threshold RSSI may be set to within a range of between −65 and −30 dBm, or between −60 to −55 dBm. For example, the threshold RSSI may be set at −58 dBm.

Returning to the example set forth above with respect to Table I, if the uplink transmitting source SD determines to use an expected RSSI of −60 dBm from the geo-location database, as set forth in Table I, and compares it to the threshold RSSI of −58 dBm, it may determine that the expected RSSI is not greater than the threshold RSSI, and proceed down the path towards steps 308-314 of FIG. 3A. Otherwise, processing would proceed down the path towards steps 330-336 of FIG. 3B. The SD may be configured to proceed down either one of steps 308-314 or steps 330-336 if the expected RSSI equals the threshold RSSI.

Assuming that it is determined at step 306 that the expected RSSI is not greater than the threshold RSSI, at step 308, the uplink source transmitting SD determines if the serving BS is a trunked or conventional BS. In some embodiments, the uplink source transmitting SD may be configured as solely a trunked or conventional device, in which case processing would proceed directly from step 306 to the corresponding one of steps 310 and 320, depending upon the type of device. In an example where the uplink source transmitting SD is capable of operating in either a trunked or conventional mode, what steps it performs after step 306 will depend on whether the serving BS is a conventional or trunked BS, as illustrated in FIG. 3A. The type of BS may be stored along with the BS ID in the geo-location database, or may be stored or configured at each SD in another manner, or may be signaled over-the-air from each serving BS via an over-the-air broadcast.

Assuming, at step 308, that the uplink serving SD is a trunked SD and/or that the serving BS is a trunked BS, processing proceeds to step 310, where the uplink source transmitting SD transmits a call request on a control channel (such as control channel 106 of FIG. 1) requesting assignment of the requested new call to an available designated low-power uplink traffic channel. A low-power uplink traffic channel is requested because, as determined at step 306, the expected RSSI is below the threshold RSSI and is thus at a level unlikely to over-power and/or otherwise interfere with immediately adjacent channels when received at the serving BS. Subsequently, and assuming that a low-power uplink traffic channel is available, at step 312, the serving BS responds by transmitting a call grant identifying the low-power uplink traffic channel to transmit the new call on. The call grant is generally broadcast so that other SDs interested in participating in the call can tune to a corresponding downlink channel to receive the new call. The uplink transmitting source SD then switches its transceiver to the low-power uplink traffic channel identified in the grant (e.g., including tuning to a particular frequency and/or time slot and/or code associated with the identified uplink traffic channel).

At step 314, the uplink source transmitting SD begins transmitting the new call on the low-power uplink traffic channel. Once the call is ended, and assuming there is no talk back from the receiving SD (for a private call) or receiving SDs (for a group call), processing proceeds to step 316 of FIG. 3B, where the call ends. At optional step 318, the uplink transmitting source SD may return to the current control channel in the system.

Returning to step 308 of FIG. 3A, if instead the uplink source transmitting SD is a conventional SD and/or the serving BS is a conventional BS, processing proceeds to step 320, where the uplink source transmitting SD determines if the current conventional channel it is on is designated or pre-allocated as a low-power uplink traffic channel. Channels may be pre-allocated (configured, perhaps via code plug) at each SD as either high-power or low-power channels, and may not change over time. In other examples, the designation of any particular conventional channel as a low-power uplink traffic channel may be pre-configured in the system and at each SD, and may be dynamically set and re-defined over-the-air via one or more conventional channel broadcast transmissions. Other possibilities exist as well.

If the current channel (including frequency and/or timeslot and/or code) to which the uplink transmitting source SD is tuned is a designated low-power uplink traffic channel and is available for the new call, processing proceeds to step 314, where the uplink source transmitting SD transmits the new call on the current conventional uplink traffic channel it is tuned to. On the other hand, if at step 320 the uplink source transmitting SD determines that it currently tuned to a high-power uplink traffic channel or some channel other than a low-power uplink traffic channel, processing proceeds to step 322, where the uplink source transmitting SD re-tunes to a designated low-power uplink traffic channel and then proceeds to step 314 and transmits the new call. Once the new call is ended, and assuming there is no talk back from the receiving SD (for a private call) or receiving SDs (for a group call), processing proceeds to step 316, where the new call ends. At optional step 318, the uplink transmitting source SD may return to the previous conventional channel it was on prior to switching to the low-power uplink traffic channel (if applicable), or may remain on the same conventional channel as the ended new call and wait for further action. In one embodiment, a conventional talkgroup may be statically assigned to both a high-power and a low-power uplink traffic channel (so that either one could be utilized, based on expected RSSI), and a group of target SDs subscribed to the same conventional talkgroup configured to scan both corresponding conventional downlink traffic channels for media from the high-power and the low-power uplink traffic channels. Other implementation possibilities exist as well.

Returning to step 306, assuming, on the other hand, that it is determined at step 306 that the expected RSSI is greater than the threshold RSSI, at step 330 of FIG. 3B, the uplink source transmitting SD determines if the serving BS is a trunked or conventional BS. In some embodiments, the uplink source transmitting SD may be configured as solely a trunked or conventional device, in which case processing would proceed directly from step 306 to the corresponding one of steps 332 and 340, depending upon the type of device. In an example where the uplink source transmitting SD is capable of operating in either a trunked or conventional mode, what steps it performs after step 306 will depend on whether the serving BS is a conventional or trunked BS, as illustrated in FIG. 3A.

Assuming, at step 330 of FIG. 3B, that the uplink source transmitting SD is a trunked SD and/or that the serving BS is a trunked BS, processing proceeds to step 332, where the uplink source transmitting SD transmits a call request on a control channel (such as control channel 106 of FIG. 1) requesting assignment of the requested new call to an available designated high-power uplink traffic channel. A high-power uplink traffic channel is requested because, as determined at step 306, the expected RSSI is above the threshold RSSI and is thus at a level likely to over-power and/or otherwise interfere with immediately adjacent channels when received at the serving BS. Subsequently, and assuming that a high-power uplink traffic channel is available, at step 334, the serving BS responds by transmitting a call grant identifying a high-power uplink traffic channel to transmit the new call on. The call grant is generally broadcast so that other SDs interested in participating in the call can tune to a corresponding downlink channel to receive the new call. The uplink transmitting source SD then switches its transceiver to the high-power uplink traffic channel identified in the grant (e.g., including tuning to a particular frequency and/or time slot and/or code associated with the identified channel).

At step 336, the uplink source transmitting SD begins transmitting the new call on the high-power uplink traffic channel. Once the call is ended, and assuming there is no talk back from the receiving SD (for a private call) or receiving SDs (for a group call), processing proceeds to step 316, where the call ends. At optional step 318, the uplink transmitting source SD may return to the current control channel in the system.

Returning to step 330, if instead the uplink source transmitting SD is a conventional SD and/or the serving BS is a conventional BS, processing proceeds to step 340, where the uplink source transmitting SD determines if the current conventional channel it is on is pre-allocated as a high-power traffic channel. The designation of any particular conventional channel as a high-power traffic channel may be pre-configured in the system and at each SD, or may be dynamically set and configured over-the-air via one or more conventional channel broadcast transmissions. If the current channel (including frequency and/or timeslot and/or code) to which the uplink transmitting source SD is tuned is a designated high-power traffic channel and is available for the new call, processing proceeds to step 336, where the uplink source transmitting SD transmits the new call on the current conventional channel it is tuned to. On the other hand, if at step 340 the uplink source transmitting SD determines that it is currently tuned to a high-power uplink traffic channel or some channel other than a high-power uplink traffic channel, processing proceeds to step 342, where the uplink source transmitting SD re-tunes to a designated high-power uplink traffic channel and then proceeds to step 336 and transmits the new call. Once the new call is ended, and assuming there is no talk back from the receiving SD (for a private call) or receiving SDs (for a group call), processing proceeds to step 316, where the call ends. At optional step 318, the uplink transmitting source SD may return to the previous conventional channel it was on prior to switching (if applicable), or may remain on the same conventional uplink traffic channel as the ended new call and wait for further action. As set forth earlier, in one embodiments, a conventional talkgroup may be statically assigned to both a high-power and a low-power uplink traffic channel (so that either one could be utilized, based on expected RSSI), and a group of target SDs subscribed to the same conventional talkgroup configured to scan both corresponding conventional downlink traffic channels for media from the high-power and the low-power uplink traffic channels. Other implementation possibilities exist as well.

Figure 4:
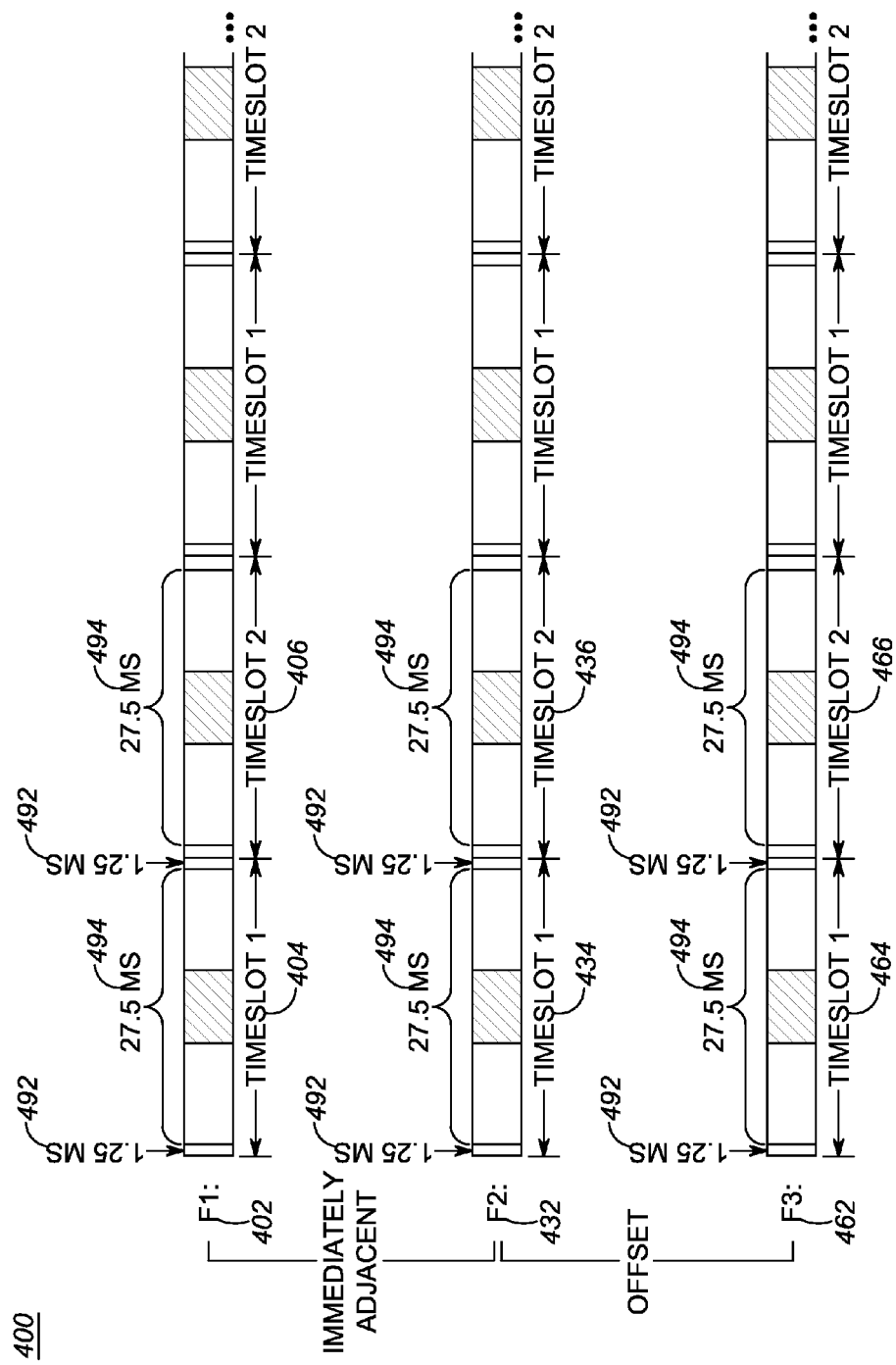
FIG. 4 is a frequency diagram illustrating an application of the process of FIGS. 3A-3B to uplink traffic channel allocation in a trunked radio system in accordance with an embodiment.

FIGS. 4 and 5 set forth frequency diagrams illustrating an application of the process of FIGS. 3A-3B to uplink traffic channel allocation in a trunked and conventional radio system, respectively, in accordance with some embodiments. FIG. 4 illustrates a trunked radio system example consistent with the ETSI-DMR standard which uses a 2:1 slotting ratio supported on a TDMA air interface. In this example, three frequencies F1 402, F2 432, and F3 462 are illustrated. It is assumed that frequencies F1 402 and F2 432 are allocated as immediately adjacent uplink traffic channels, while frequency F3 462 is offset from both frequencies F1 402 and F2 432 (although may have its own immediately adjacent frequency, not shown). In the illustrated embodiment, the radio controller in the system, such as radio controller 172 of FIG. 1, has synchronized the time slots of the immediately adjacent TDMA channels so that timeslot 1 404 on F1 402 is time-synchronized with timeslot 1 434 on F2 432. In accordance with the ETSI-DMR standard, each frequency F1-F3 carries two TDMA uplink traffic channels via two repeating timeslots 1 and 2. For example, frequency F1 402 carries a first uplink traffic channel on timeslot 1 404 and a second uplink traffic channel on timeslot 2 406. Similarly, immediately adjacent frequency F2 432 carries a first uplink channel on timeslot 1 434 and a second uplink traffic channel on timeslot 2 436. Finally, offset frequency F3 462 carries a first uplink channel on timeslot 1 464 and a second uplink traffic channel on timeslot 2 466. Each timeslot includes a 1.25 ms guardband 492 at the beginning and end of the timeslot, and a 27.5 ms payload 494 that includes sync information in the center.

Referring to FIG. 1, and assuming that SD 110 has already requested a high-power uplink traffic channel and been assigned a high-power uplink traffic channel on timeslot 1 404 on F1 402, and that SD 130 has already requested a low-power uplink traffic channel and been assigned a low-power uplink traffic channel on timeslot 2 436 on F2 432, let us assume that SD 140 now requests a high-power uplink traffic channel. Radio controller 172 may receive the request and determine whether any high-power uplink traffic channels are available. Because timeslot 1 404 has already been assigned as a high-power traffic channel, corresponding timeslot 1 434 may be reserved as a high-power traffic channel as well since it cannot be assigned as a low-power traffic channel (as it will be over-powered by and/or interfered with by the high-power traffic channel of timeslot 1 404 due to its immediate adjacency to timeslot 1 404 on F1 402). Of course, one or more of timeslots 1 464 and 2 466 on non-adjacent frequency F3 462 may be available as well. In any event, assume that the radio controller 172 assigns the new call from SD 140 to high-power timeslot 1 434.

Now assume that SD 120 requests a low-power uplink traffic channel. Because timeslot 2 436 of F2 432 was assigned as a low-power uplink traffic channel, the radio controller 172 is free to assign the corresponding timeslot 2 406 on F1 402 as a low-power uplink traffic channel as well, as there is no concern about the low-power transmission on timeslot 2 436 over-powering or interfering with timeslot 2 406 on F1 402. Of course, one or more of timeslots 1 464 and 2 466 on non-adjacent frequency F3 462 may be available as well. In any event, assume that the radio controller assigns the new call from SD 120 to low-power timeslot 2 406.

Now assume that another SD (not shown in FIG. 1) requests a high-power uplink traffic channel, and that timeslots 1 464 and 2 466 are pre-allocated as low-power uplink traffic channels. At this point, the radio controller 172 may either dynamically modify the allocation of timeslots 1 464 and 2 466 as low-power uplink traffic channels and change one to a high-power uplink traffic channel (assuming no adjacent frequencies to F3 462 are carrying a low-power call that would be interfered with), or it may simply deny the call. If the call were denied, the requesting SD could request another high-power uplink traffic channel at a later time in the hope that a high-power uplink traffic channel had become available, or could request a low-power uplink traffic channel once it determines that it has moved far enough away from the serving BS to qualify for a low-power traffic channel (based on expected RSSI). Other possibilities exist as well. Of course, the examples set forth in FIG. 4 are exemplary in nature only, and other TDMA protocols, trunked protocols, and/or slotting ratios could be implemented as well. Furthermore, different allocations of statically or dynamically defined high-power and low-power uplink traffic channels could be implemented as well.

Turning now to FIG. 5, this figure illustrates a conventional radio system example that uses an FDMA air interface. In this example, three frequencies F1 502, F2 532, and F3 562 are illustrated. It is assumed that frequencies F1 502 and F2 532 are allocated as immediately adjacent uplink traffic channels, while frequency F3 562 is offset from both frequencies F1 502 and F2 532 (although may have its own immediately adjacent frequency, not shown). Each frequency F1-F3 carries one FDMA uplink traffic channel, which may be shared amongst one or more SDs or group of SDs.

Referring to FIG. 1, and assuming that SD 110 has already requested a high-power uplink traffic channel and been assigned a high-power uplink traffic channel via F1 502, let us assume that SD 140 now requests a high-power uplink traffic channel. Radio controller 172 may receive the request and determine whether any high-power uplink traffic channels are available. Because frequency 1 502 has already been assigned as a high-power traffic channel, frequency 2 532 may be (at least temporarily) reserved as a high-power traffic channel as well since it cannot be assigned as a low-power traffic channel (as it will be over-powered by and/or interfered with by the high-power traffic channel of F1 502 due to its immediate adjacency to F1 502). Of course, the call may be granted on non-adjacent frequency F3 562 if it is available, as well. In any event, assume that the radio controller assigns the new call from SD 140 to the FDMA channel on frequency F2 532.

Now assume that SD 120 requests a low-power uplink traffic channel. As long as either one of the calls on FDMA channels F1 502 or F2 532 are still on-going, the requested low-power call from SD 120 cannot be assigned to either one of F1 502 or F2 532. Of course, non-adjacent frequency F3 462 may be available, assuming no high-power calls are on-going on a frequency immediately adjacent to it. In any event, assume that the radio controller assigns the new call from SD 120 to FDMA channel F3 502.

Now assume that SD 130 requests a high-power uplink traffic channel. If either one of the calls on FDMA channels F1 502 or F2 532 has ended, that channel can be assigned to the call from SD 130. If the low-power call on FDMA channel F3 562 has ended, the radio controller 172 may either dynamically modify the allocation of FDMA channel F3 as a high-power uplink traffic channel (assuming no adjacent frequencies to F3 562 are carrying a low-power call that would be interfered with), or it may simply deny the call. If the call were denied, the requesting SD could request another high-power uplink traffic channel at a later time in the hope that a high-power uplink traffic channel becomes available, or request a low-power uplink traffic channel once it determines that it has moved far enough away from the serving BS to qualify for a low-power traffic channel (again, if one is available). Other possibilities exist as well.

Using the example frequency diagram set forth in FIG. 5, a particular talkgroup may be assigned to both a high-power uplink traffic channel (F1 502) and a low-power uplink traffic channel (F3 562), either of which may be shared with other talkgroups. Non-transmitting member SDs of that particular talkgroup would then need to monitor both corresponding downlink traffic channels corresponding to F1 502 and F3 562 for new call directed to the particular talkgroup. In embodiments where only immediately adjacent conventional uplink traffic channels F1 502 and F2 532 are available, both may be initially reserved as low-power uplink traffic channels and, if requested, may both be transitioned to high-power uplink traffic channels upon request from a source transmitting SD with a high-power expected RSSI. Once all high-power uplink traffic channel calls on channels F1 502 and F2 532 are finished, the channels may transition back to low-power uplink traffic channels.

Of course, the examples set forth in FIG. 5 are exemplary in nature only, and other FDMA protocols, conventional protocols, frequency arrangements could be implemented as well. Furthermore, different allocations of statically or dynamically defined high-power and low-power uplink traffic channels could be implemented as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for improving spectral efficiency by assigning uplink channels according to expected receive signal levels at a serving base station providing wireless communications to a first subscriber device, the method comprising:
   detecting, at the first subscriber device, a new call request indication;
   determining, as a function of the first subscriber device transmit power level and its current location relative to the serving base station, an expected receive signal strength indication (RSSI) of signals transmitted by the first subscriber device and received at the serving base station;
   if it is determined that the expected RSSI is greater than a pre-determined RSSI threshold:
      one of (i) transmitting a call request to the serving base station requesting an assignment to a designated high-power channel for the new call and (ii) transmitting the new call on a pre-allocated high-power channel; and
   if it is determined that the expected RSSI is less than the pre-determined RSSI threshold:
      one of (i) transmitting a call request to the serving base station requesting an assignment to a designated low-power channel for the new call and (ii) transmitting the new call on a pre-allocated low-power channel.

2. The method of claim 1, wherein the serving base station is a trunked base station comprising a plurality of repeaters, the call request is transmitted to a control channel repeater at the trunked base station, and the first subscriber device is assigned to transmit the call on a corresponding designated high-power traffic channel or low-power traffic channel via a traffic channel repeater different from the control channel repeater.

3. The method of claim 1, wherein the step of determining the expected RSSI of signals transmitted by the first subscriber device and received at the serving base station comprises:
   determining, by the first subscriber device, a current geographic location of the first subscriber device via one of a global navigation satellite system (GNSS) receiver and a time difference of arrival (TDOA) calculation using a plurality of different base station received signals;
   determining, by the first subscriber device via a locally stored geo-location database, a geographic location of the serving base station; and
   calculating, by the first subscriber device, using a propagation model, the first subscriber device transmit power level, the first subscriber device's determined current geographic location, and geographic location of the serving base station, the expected RSSI of signals transmitted by the first subscriber device and received at the serving base station.

4. The method of claim 3, wherein the propagation model is one of a height above average terrain (HATA) model, a point to point Lee model, an area to area Lee model, a Longley-Rice model, and an Okumura-Hata model.

5. The method of claim 3, further comprising determining, by the first subscriber device via the locally stored geo-location database, serving base station antenna information including one or more of antenna gain, antenna height, and antenna pattern, the step of calculating the expected RSSI of signals transmitted by the first subscriber device and received at the serving base station further comprising using the serving base station antenna information.

6. The method of claim 3, further comprising determining, by the first subscriber device, first subscriber device antenna information including antenna gain, the step of calculating the expected RSSI of signals transmitted by the first subscriber device and received at the serving base station further comprising using the first subscriber device antenna information.

7. The method of claim 1, wherein the step of determining the expected RSSI of signals transmitted by the first subscriber device and received at the serving base station comprises:
   determining, by the first subscriber device, a current geographic location of the first subscriber device via one of a global navigation satellite system (GNSS) receiver and a time difference of arrival (TDOA) calculation using a plurality of different base station received signals;
   accessing, by the first subscriber device, a locally stored geo-location database associated with the serving base station, that includes, for all regions within wireless communication range of the serving base station, pre-calculated expected RSSIs; and
   based on which region the determined current geographic location of the first subscriber device falls within the locally stored geo-location database, using the corresponding pre-calculated expected RSSI as the expected RSSI of signals transmitted by the first subscriber device and received at the serving base station.

8. The method of claim 1, wherein the step of determining the expected RSSI of signals transmitted by the first subscriber device and received at the serving base station comprises:
   determining, by the first subscriber device, a geographic distance between the first subscriber device and the serving base station;
   accessing, by the first subscriber device, a locally stored pre-calculated mapping that determines, as a function of the determined distance alone, pre-calculated expected RSSIs; and
   based on the determined geographic distance between the first subscriber device and the serving base station, using the corresponding pre-calculated expected RSSI as the expected RSSI of signals transmitted by the first subscriber device and received at the serving base station.

9. The method of claim 1, wherein it is determined that the expected RSSI is greater than the pre-determined RSSI threshold, and the one of the designated high-power channel and pre-allocated high-power channel is a first time slot on a first time division multiple access (TDMA) uplink traffic channel in a TDMA system.

10. The method of claim 9, wherein the first TDMA uplink traffic channel is immediately adjacent a second TDMA uplink traffic channel on a separate but adjacent frequency to the frequency of the first TDMA uplink traffic channel, and wherein a corresponding time slot on the adjacent second TDMA uplink traffic channel that at least partially overlaps the first time slot on the first TDMA uplink traffic channel is not assigned or used for a low-power call during the new call.

11. The method of claim 10, wherein the corresponding time slot on the adjacent second TDMA uplink traffic channel is also designated or pre-allocated as a high-power channel.

12. The method of claim 11, wherein a second time slot on the first TDMA uplink traffic channel is designated or pre-allocated as a low-power channel, and wherein a second corresponding time slot on the adjacent second TDMA uplink traffic channel that at least partially overlaps the second time slot on the first TDMA uplink traffic channel is designated or pre-allocated as a low-power channel.

13. The method of claim 1, wherein it is determined that the expected RSSI is greater than the pre-determined RSSI threshold, and the one of the designated high-power channel and pre-allocated high-power channel is a first frequency division multiple access (FDMA) uplink traffic channel in an FDMA system.

14. The method of claim 13, wherein the first FDMA uplink traffic channel is immediately adjacent a second FDMA uplink traffic channel, and wherein the corresponding second FDMA uplink traffic channel is not assigned or used for a low-power call during the new call.

15. The method of claim 1, wherein the pre-determined RSSI threshold is within the range of −60 to −40 dBm.

16. A subscriber device for improving spectral efficiency by requesting or using uplink channels according to expected receive signal levels at a serving base station providing wireless communications to the subscriber device, the subscriber device comprising:
   a transceiver;
   a memory; and
   a processor configured to:
      detect a new call request indication;
      determine, as a function of the subscriber device transmit power level and its current location relative to the serving base station, an expected receive signal strength indication (RSSI) of signals transmitted by the subscriber device and received at the serving base station;

if it is determined that the expected RSSI is greater than a pre-determined RSSI threshold:
   one of (i) transmit a call request, via the transceiver, to the serving base station requesting an assignment to a designated high-power channel for the new call and (ii) transmit the new call, via the transceiver, on a pre-allocated high-power channel; and if it is determined that the expected RSSI is less than the pre-determined RSSI threshold:
   one of (i) transmit, via the transceiver, a call request to the serving base station requesting an assignment to a designated low-power channel for the new call and (ii) transmit, via the transceiver, the new call on a pre-allocated low-power channel.

17. The subscriber device of claim 16, wherein the processor is further configured to determine the expected RSSI of signals transmitted by the subscriber device and received at the serving base station by:
   determining a current geographic location of the subscriber device via one of a global navigation satellite system (GNSS) receiver and a time difference of arrival (TDOA) calculation using a plurality of different base station received signals;
   determining, via a locally stored geo-location database, a geographic location of the serving base station; and
   calculating, using a propagation model, the subscriber device transmit power level, the subscriber device's determined current geographic location, and geographic location of the serving base station, the expected RSSI of signals transmitted by the subscriber device and received at the serving base station.

18. The subscriber device of claim 16, wherein the processor is further configured to determine the expected RSSI of signals transmitted by the subscriber device and received at the serving base station by:
   determining a current geographic location of the subscriber device via one of a global navigation satellite system (GNSS) receiver and a time difference of arrival (TDOA) calculation using the transceiver and a plurality of different base station received signals;
   accessing a locally stored geo-location database associated with the serving base station, that includes, for all regions within wireless communication range of the serving base station, pre-calculated expected RSSIs; and
   based on which region the determined current geographic location of the subscriber device falls within the locally stored geo-location database, using the corresponding pre-calculated expected RSSI as the expected RSSI of signals transmitted by the subscriber device and received at the serving base station.

19. The subscriber device of claim 16, wherein the processor is further configured to determine the expected RSSI of signals transmitted by the subscriber device and received at the serving base station by:
   determining a geographic distance between the subscriber device and the serving base station;
   accessing a locally stored pre-calculated mapping that determines, as a function of the determined distance alone, pre-calculated expected RSSIs; and
   based on the determined geographic distance between the subscriber device and the serving base station, using the corresponding pre-calculated expected RSSI as the expected RSSI of signals transmitted by the subscriber device and received at the serving base station.

20. The subscriber device of claim 16, wherein the pre-determined RSSI threshold is within the range of −60 to −40 dBm.

* * * * *